US008802455B2

(12) United States Patent
Tailliet et al.

(10) Patent No.: US 8,802,455 B2
(45) Date of Patent: Aug. 12, 2014

(54) SECURITY-PROTECTION OF A WAFER OF ELECTRONIC CIRCUITS

(75) Inventors: Francois Tailliet, Fuveau (FR); Marc Battista, Marseille (FR); Luc Wuidart, Pourrieres (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 319 days.

(21) Appl. No.: 13/435,201

(22) Filed: Mar. 30, 2012

(65) Prior Publication Data
US 2012/0250429 A1    Oct. 4, 2012

(30) Foreign Application Priority Data
Apr. 1, 2011    (FR) .................................... 11 52798

(51) Int. Cl.
*H01L 21/66*    (2006.01)

(52) U.S. Cl.
USPC ........................................... 438/18; 257/620

(58) Field of Classification Search
USPC .............. 438/18; 257/620, E27; 365/189.011
See application file for complete search history.

(56) References Cited

U.S. PATENT DOCUMENTS

| 4,766,516 A | 8/1988 | Ozdemir et al. |
| 2005/0138499 A1 | 6/2005 | Pileggi et al. |
| 2010/0284539 A1 | 11/2010 | Roy et al. |
| 2010/0304509 A1* | 12/2010 | Aghababazadeh et al. ..... 438/17 |
| 2011/0127646 A1* | 6/2011 | Kang et al. .................... 257/620 |

FOREIGN PATENT DOCUMENTS

| DE | 10123362 | 11/2002 |
| EP | 1826580 | 8/2007 |
| WO | 9215074 | 9/1992 |

* cited by examiner

*Primary Examiner* — Vu Le
(74) *Attorney, Agent, or Firm* — Allen, Dyer, Doppelt, Milbrath & Gilchrist, P.A.

(57) ABSTRACT

A process is provided for fabricating a wafer including a plurality of chips separated by scribe lines. The method includes locking at least one chip on the wafer using a secret key, and writing the secret key into at least one memory present on the wafer.

31 Claims, 4 Drawing Sheets

SECURITY-PROTECTION OF A WAFER OF ELECTRONIC CIRCUITS

TECHNICAL FIELD

The present application relates to a process for fabricating an integrated circuit, wafers, and related fabrication and test procedures. Further, devices for fabricating a wafer and fabricating integrated circuits and a related system are also provided.

BACKGROUND

The fabrication of integrated circuits typically begins with a first phase of wafer-scale fabrication of electronic elements on a silicon wafer. Each individual element is called a "die", or simply a chip. They are diced and integrated into a package to form the integrated circuits. This first phase generally includes a step in which all the chips on the wafer are tested. A first entity is generally responsible for these wafer fabrication and test operations and a second, often separate, entity is concerned with finalizing the fabrication of the integrated circuits by assembling the chips and dicing the wafers and incorporating the chips into a package.

One approach for wafer testing involves depositing a mark on defective chips using ink, so that they can be visually identified when being subsequently diced. This approach requires management of the ink used, including its supply and its storage. It also requires a special machine for depositing the ink with great precision, and then an ink detection machine for sorting out the defective chips during the dicing operation. It should be pointed out that this technique is not suitable for very small chips. Finally, since the ink is by nature toxic, it is necessary to take precautions for protecting personnel and the environment. Finally, this approach is expensive and may have other drawbacks.

Another approach involves storing the test data in memory in an independent file. Such a file should first be able to identify the wafer in question, and then be able to identify each defective chip on the wafer by its coordinates x, y, for example. A drawback of this approach is that it requires the separate management of a file, which has to be transmitted from the first entity to the second, which then uses a specific tool to decipher it and make the link with the corresponding wafer to be able to remove the defective chips when the wafer is being diced. There is a risk of associating a file with the wrong wafer, or even a risk of losing the file. It should also be pointed out that there is no standard for such a file that would facilitate its use. The second entity may therefore be required to manage different processes for various wafer manufacturers.

At the end of fabrication, the second entity which has received the wafers dices them into the various chips. The chips may number from several tens of chips up to several thousand chips per wafer. The defective chips are removed, and the non-defective chips are then encapsulated in packages for future use.

The existing processes for fabricating integrated circuits therefore have the above-mentioned drawbacks, and there may be a need for a better approach.

SUMMARY

In view of the foregoing, one objective is to provide a relatively inexpensive, simple and security-protected approach for fabricating an integrated circuit.

To this end, a process for fabricating a wafer which comprises a plurality of chips separated by scribe lines. The process includes locking at least one chip on the wafer using a secret key, and writing this secret key into at least one memory present on the wafer. The write step may include writing at least two secret keys for locking two separate chips into the same memory present on the wafer.

The process for fabricating a wafer may comprise writing at least one secret key into a memory of a chip on the wafer. As a variant, the process may comprise writing at least one secret key into a memory positioned on a scribe line on the wafer. The process for fabricating a wafer may comprise writing at least one secret key into a memory on the wafer by contactless communication between a reader and a contactless communication device placed at least partly on a scribe line on the wafer and linked to the memory. The process may further comprise connecting contacts of a probe to a chip on the wafer, followed by writing at least one secret key into a memory of a processing chip via a link between this chip and the processing chip.

The process may also comprise locking all the chips on the wafer using one secret key per chip, followed by writing all the secret data keys into one or more memories on the wafer. The secret keys for locking each chip on the wafer may be separate. Furthermore, a chip may be placed on the wafer that carries out all or part of a wafer test or security program by communication with at least one other chip on the wafer.

A process is also provided for fabricating integrated circuits from a wafer obtained by the fabrication process described above, which includes unlocking at least one chip on the wafer. The process may also comprise reading at least one secret key in a memory on the wafer, and the unlocking may comprise unlocking a chip using this secret key. The reading of the at least one secret key in a memory on the wafer may be carried out by contactless communication via a contactless communication device at least partly placed in a scribe line on the wafer. The contactless communication may be of an inductive or a capacitive type.

The process for fabricating integrated circuits may also comprise unlocking at least one chip on the wafer by a processing chip on the wafer that is linked via a communication bus to the chip. The process may also include unlocking all the chips on the wafer followed by dicing the chips on the wafer.

A device for fabricating a wafer is also provided, which may include a reader that implements the process for fabricating a wafer as described above. A device for fabricating integrated circuits is further provided, which may include a reader that implements the process for fabricating integrated circuits as described above. Furthermore, a system for fabricating integrated circuits may include a device for fabricating a wafer as described above, and a device for fabricating integrated circuits as described above.

A wafer including a plurality of chips separated by scribe lines is also provided. The wafer may include a memory in which secret keys for locking/unlocking at least two separate chips on the wafer are stored. The wafer may include a chip on the wafer or a processing chip placed in the scribe lines on the wafer, which is linked to at least one separate chip on the wafer via a communication link and that comprises a test or security program capable of testing or locking/unlocking the at least one separate chip on the wafer.

BRIEF DESCRIPTION OF THE DRAWINGS

The foregoing objects, features and advantages will be explained in detail in the following description of non-limiting example embodiments in relation to the appended figures, in which.

DETAILED DESCRIPTION

Figure 1:
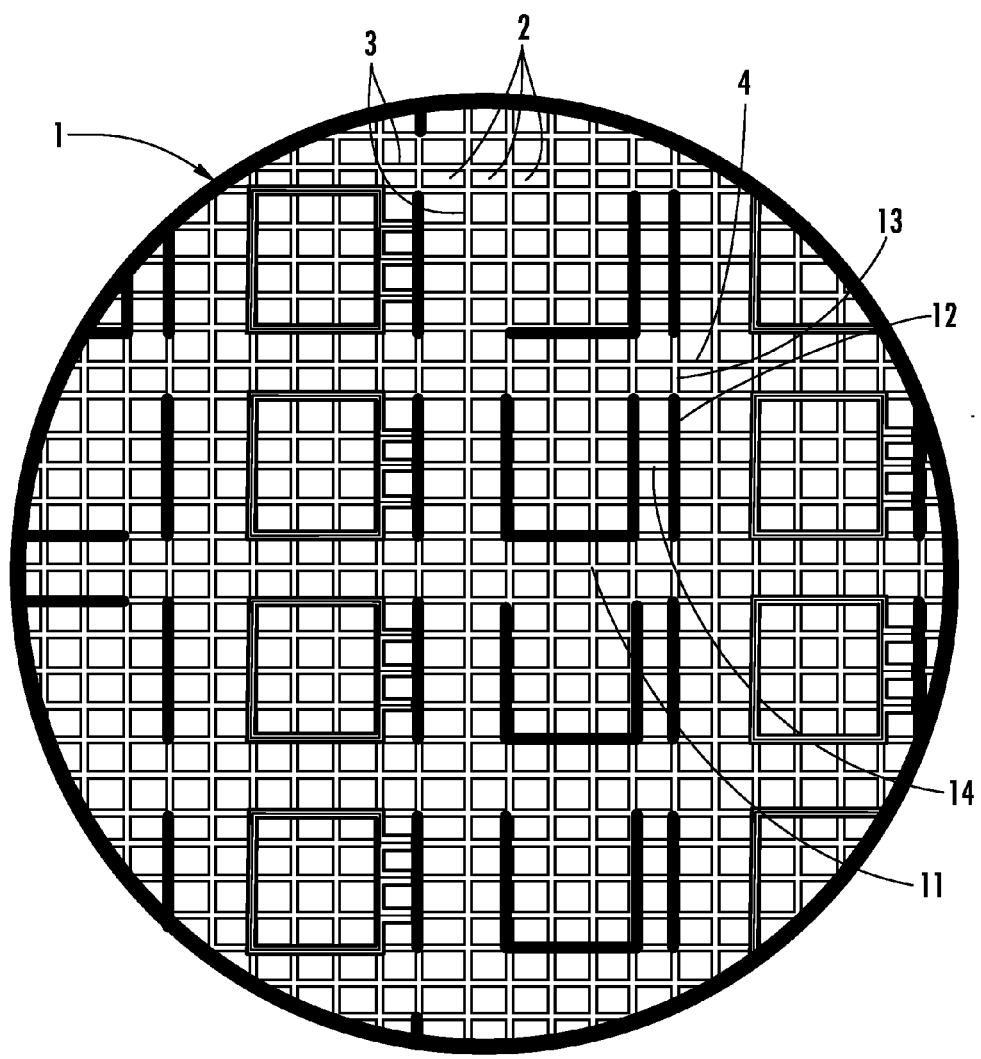
FIG. 1 is a schematic top view of a wafer according to one embodiment of the invention.
Figure 2:
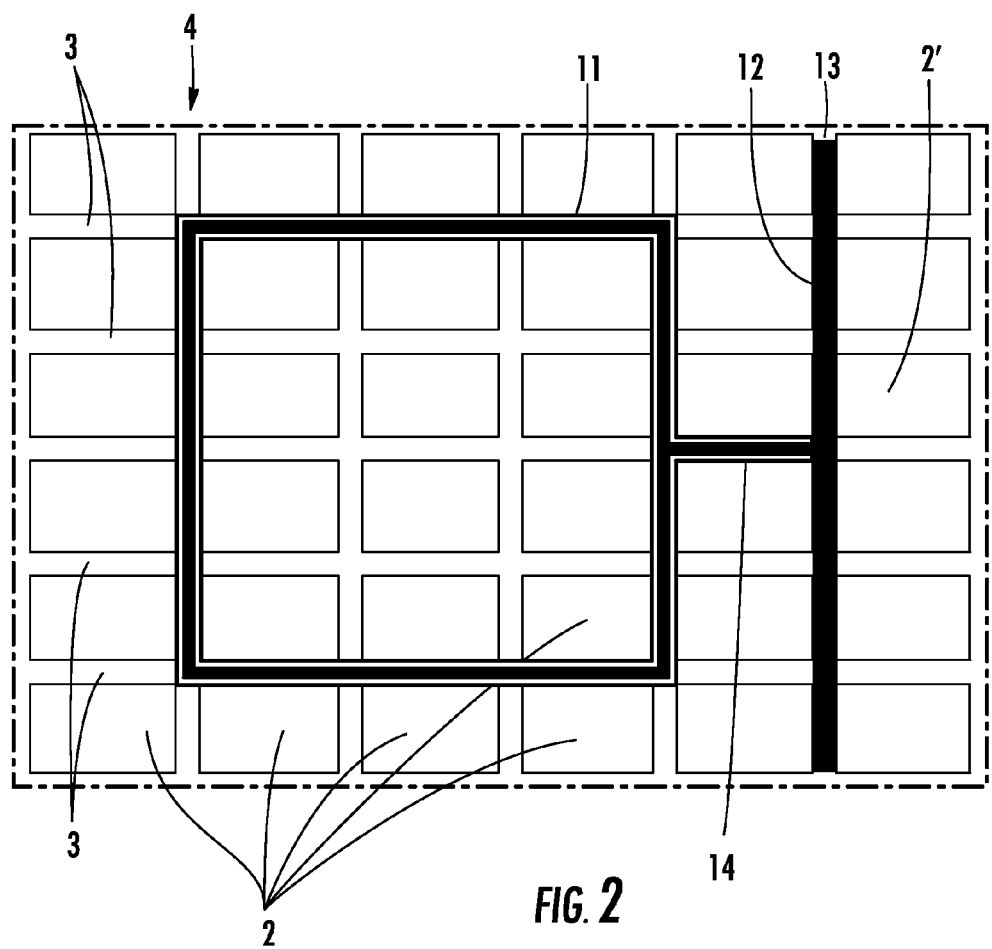
FIG. 2 is a schematic diagram of a portion of the wafer according to the embodiment of FIG. 1.

Turning to FIG. 1, a wafer 1 includes a plurality of chips 2 regularly distributed along rows and columns and separated by scribe lines 3 intended to enable their future separation when the wafer 1 is being diced. The wafer comprises a repetition of identical subassemblies, called photo-repeated fields 4, obtained by the reticles of a mask. Each photo-repeated field 4 (which are shown in greater detail in FIG. 2) includes several chips 2 intended to form the future integrated circuits, and also a special processing chip 12 placed on a scribe line 13. In accordance with the present embodiment, the processing chip 12 has an elongate shape and occupies substantially an area measuring 25 mm by 80 µm. A photo-repeated field 4 also includes an antenna 11 of square or rectangular shape. The antenna 11 is placed on scribe lines 3 and linked via a link 14, also running along a scribe line, to the processing chip 12, enabling it to communicate contactlessly with a remote reader equipped with a corresponding antenna. In the illustrated embodiment, the antenna 11 has a rectangular shape measuring about 30 mm by 25 mm, and has a width of 80 µm, corresponding to the available width in a scribe line 3. Of course, the antenna 11 may have another shape and another path along the scribe lines 3, enabling it to have different dimensions, if necessary.

In the present embodiment, the processing chip 12 is of the "dual" type, meaning it is designed for contact communication via an electrical contact with an external element and designed for contactless communication via the antenna 11. Moreover, the processing chip 12 includes a communication interface for implementing the two above-mentioned types of communication, and a memory.

Figure 3:
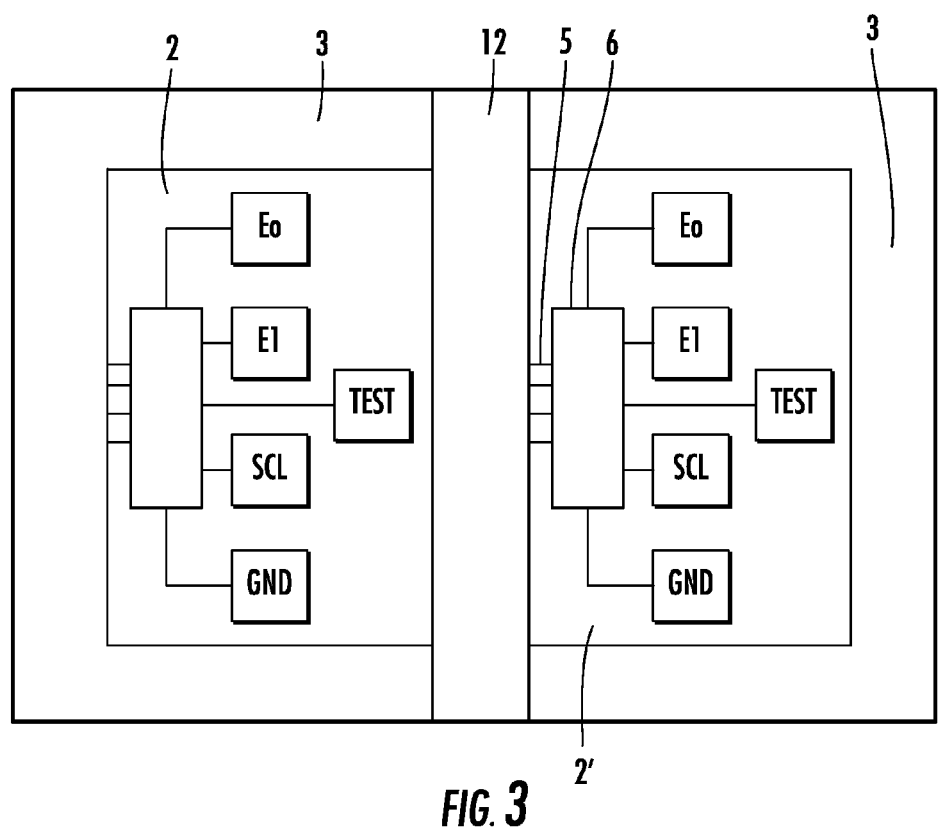
FIG. 3 is a schematic diagram showing an enlarged portion of the wafer according to the embodiment of FIG. 1.

The processing chip 12 is connected to an adjacent chip 2' via a wire link 5, as shown in FIG. 3. This wire link 5, which is a series connection, allows communication according to the standardized I2C protocol between the two chips 2' and 12 and comprises four connections between the standardized contacts of the two chips. For example, the chip 2' may connect its four standardized contacts SCL, E0, E1 and gnd to the respective four standardized contacts SCL, Vdd, SDA and gnd of the processing chip 12. Of course, the communication between the two chips may use other communication protocols and other types of connections. The chip 2' of the photo-repeated field 4 therefore provides a particular function. It is involved in the test phase, especially serving as an intermediary for communication between the processing chip and an external reader, as will be explained in detail below. It may be desirable not to power the chip 2' during such communication to avoid interference. In addition, a control block 6 controls the communications to the processing chip 12 in a predefined test mode to mitigate the risk of a short circuit in the step of dicing the wafer.

The wafer 1 described above allows for an advantageous test procedure, and more generally a process for fabricating integrated circuits, to be implemented. The test procedure includes a step (Block 42) of writing data representing the results of the test into a memory present on the wafer itself. This avoids having to mark the wafer with ink, or having to manage an external file independent of the wafer. This memory may be a non-volatile memory, such as an EEPROM.

Figure 4:
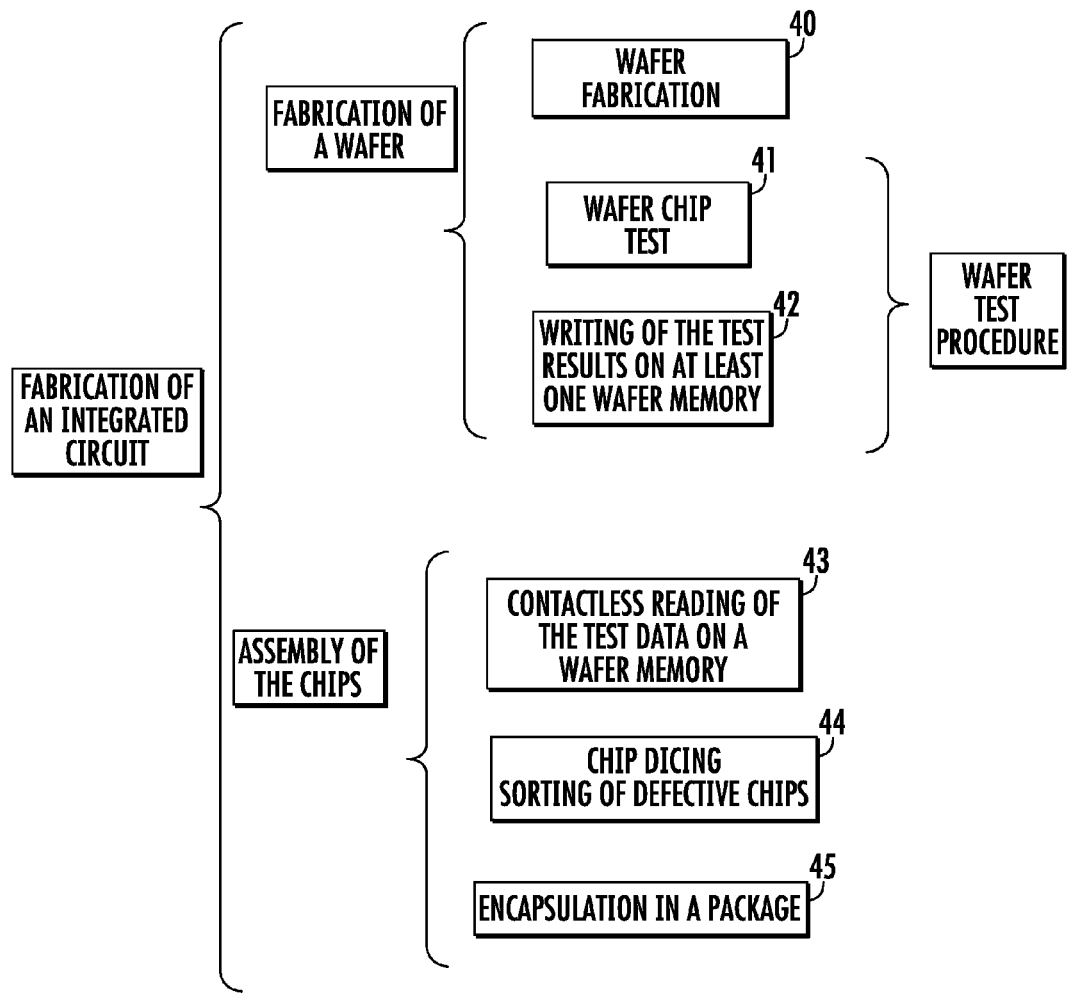
FIG. 4 is a flowchart of the process for fabricating an integrated circuit according to an embodiment of the invention.

The process for fabricating the wafer, which is illustrated in FIG. 4, includes the following steps. At Block 41, each chip 2 of the wafer is tested by moving a test probe over the wafer. The contacts of the probe are placed in succession on the contacts of the various chips 2 to communicate with these chips and implement the test procedures, in a known manner. At Block 42, the test result data is written into at least one memory on the wafer. Of course, this test procedure comes after fabricating a wafer (Block 40), which comprises in particular the positioning of a contactless communication element, such as an antenna, at least partly on the scribe lines 3 of the wafer. The test step (Block 41) includes the standardized wafer test known as EWS (Electrical Wafer Sort). However, other tests may be used.

More particularly, the second data writing step (Block 42) includes the following sub-steps. At Block 41, the contacts of the test probe are connected to the contacts of the adjacent chip 2' linked to the processing chip 12. At Block 42, the test result data is transmitted from the test probe to a memory of the processing chip 12 via the link 5 between the adjacent chip 2' and the processing chip 12. The data stored on the wafer 1 may include: a number associated with the wafer, or other identifier; the number of chips 2 considered to be good after the test; and the position of the defective chips 2, e.g., identified by their x-y coordinates in the plane of the wafer. The above approach provides that the results of the test will be present on the wafer until it is diced—the results will neither be lost nor confused with those of other wafers.

To carry out the test, the first entity has a test device comprising a test probe associated with a particular reader, which is capable of writing a data item into the memory on the wafer. According to one embodiment, a processing chip 12 is connected to all of the chips 2 of the photo-repeated field 4 via communication buses, according to a principle similar for example to that described in document EP 606,805. A processing chip serves for directly carrying out the test procedures on the various chips and generates data from these tests that remains stored in its memory, with reduced use of an external test reader or even without such a test reader. To do this, the processing chip includes a program that it executes for carrying out the tests. With this approach, the steps illustrated at Blocks 41 and 42 of the fabrication process are carried out automatically and transparently for an external operator.

According to one embodiment, the chip test sorts the chips 2 into more than two categories, according to their test score obtained in these tests, enabling the most defective chips to be separated off, but also to provide different applications for the chips on one and the same wafer according to the quality requirement for each application. In accordance with another advantageous embodiment, when a first entity has finalized the fabrication of a wafer, including a test as described above, the wafer is then sent to a second entity that assembles the chips to finalize the fabrication of integrated circuits from the wafer. The second entity has an integrated-circuit fabrication device including a reader for reading the test result data from the memory of the processing chips 12 on the wafer 1. The device then dices the various chips and separates off the defective chips, identified by the data read during the preceding step. The device therefore finalizes the integrated-circuit fabrication and carries out the following steps of the fabrication process: reading of the test result data on the wafer (Block 43); dicing of the wafer, with the defective chips being separated off (Block 44); and encapsulation of the other chips in a package (Block 45).

In another advantageous embodiment, the data read-out step (Block 43) comprises contactless communication between the reader of the integrated-circuit fabrication device and the processing chips 12 to transmit the test result data via the antennas 11 on the wafer 1. To do so, the reader comprises a resonant circuit including an antenna designed to correspond with an antenna 11 positioned on the wafer to implement remote electromagnetic communication. The resonant circuit of the reader induces electromagnetic resonance of the antenna 11 of the wafer, thus allowing communication. Such wireless communication of the inductive type may correspond to the known conventional standards such as those based on a frequency of 13.56 MHz over a short range, of less than 10 cm. The contactless communication allows the information relating to the test data stored in memory on a processing chip to be obtained very rapidly and easily. This is advantageous and allows for an effective automatic processing of the wafer, and provides a rapid and reliable process for fabricating integrated circuits.

In one embodiment, the contactless communication includes a security step to prevent malicious access to the data stored on the wafer should the latter be stolen, for example. To do so, there may be an initial phase of authentication between the reader and a processing chip on the wafer, e.g., based upon a secret key known only to the reader. The secret key may be sent by a separate communication from that with the wafer, such as from another communication system.

Next, a step of dicing the chips (Block 44) results at the same time in the physical destruction of the components placed on the scribe lines 3. This prevents confidential information found in a memory of the processing chips 12 from being recovered by a third party after the wafer has been diced, for example. The chips considered to be non-defective are integrated into a package, in a last step 45, which forms the integrated circuits.

According to one embodiment, the chips on the wafer have been sorted into various categories during the wafer test step (Block 41) according to predefined quality criteria, as mentioned above. In such case, the wafer dicing step (Block 44) comprises a different destination for the chips of the various categories followed by a final step comprising the integration of the various chips in a package taking account of their category. Thus, chips of different categories are aimed at different applications, the highest-quality chips being designed for the most demanding applications, and so on. This approach makes it possible for at least two chips on the same wafer to be designed for different final uses and to be integrated into two different packages.

The above description applies to all types of wafers, irrespective of the type of chip fabricated, which may be a complex chip of the microprocessor type or a simple memory, for example. It should be noted that if a chip on the wafer is of the "dual" type (i.e., designed for the two types of communication, namely contact and contactless communication), one of them may replace a processing chip 12 and be connected directly to an antenna 11 on the wafer. In this case, adopting the embodiment described, a variant includes directly connecting the link 14 of an antenna 11 with the chip 2' over each photo-repeated field, dispensing with the processing chip 12 on the scribe lines. The chip 2' then becomes the processing chip of the photo-repeated field 4. According to another variant, a processing chip incorporating the two (contactless and contact) communication devices may be used to be able to operate independently, without the need for a link 5 with an intermediate chip 2'.

According to one embodiment, the wafer may comprise any contactless communication device. Thus, the antenna 11 provided for electromagnetic resonance may lie only over part of its length in a scribe line 3 on the wafer 1. The rest of its length may be, for example, on an upper surface of the wafer, above the chips. As a variant, the contactless communication device may be of a different type, performing contactless communication by an effect other than the electromagnetic or inductive radiation explained above. For example, such a communication device may comprise various parallel conducting lines integrated into the scribe lines on the wafer, allowing contactless communication via capacitive effect. A reader may comprise a corresponding terminal, e.g., based on a metal plate that is superimposed on the conducting lines of the wafer.

Moreover, the above embodiment has been illustrated based upon one processing chip and one contactless communication device per photo-repeated field, thereby making it possible to enhance the volume available on the wafer and the processing time of the processes described above. However, other numbers of processing chips and/or communication devices may be used, such as a single one for the entire wafer or for several photo-repeated fields, or several per photo-repeated field. In addition, the data stored on the processing chips may be distributed according to proximity criteria. In the illustrated example, the processing chip 12 of a certain photo-repeated field 4 integrates the data corresponding to the chips 2, 2' of this photo-repeated field. As a variant, other distributions of the data storage may be used, provided that a memory receives data relating to at least two different chips on the wafer. In particular, it is possible to duplicate the same data on several chips to reduce the risk of losing data should a processing chip be defective, for example. In addition, the stored data may be of various types and occupy different memory spaces, and the approach described herein is not limited to a certain type of data.

According to one embodiment, the security of a wafer 1 may be increased by locking one or more chips 2 which make up the wafer and advantageously all the chips. This locking is obtained by way of a secret key, which when used with an encryption algorithm enables access to at least one chip 2 to be unlocked. The secret key is therefore used for future operation of the chip. In the example embodiment, each chip on the wafer is locked by its own unique secret key. The various secret keys are therefore different and are advantageously stored in a memory placed on the wafer itself, e.g., the memory of at least one processing chip 12 described above, or another memory placed on the wafer, which we will be referred to herein as a security memory. Thus, the security memory may be a memory of one of the chips on the wafer. The communication with the security memory takes place in a similar manner to the communication with a processing chip explained above.

According to one advantageous embodiment, several security memories are provided to achieve a generally high storage capacity on the wafer and/or to preserve a copy of the stored information. This is useful if a memory were to become inaccessible for any reason. However, a smaller scale version may be desirable where a memory on the wafer comprises at least one locking/unlocking key for at least two different chips on the wafer.

This security memory of the wafer, which contains the secret keys for operating the chips, may be security-protected, with access controlled by high-performance security algorithms. It forms a "safe" for the secret keys that it contains, and the keys do not leave the safe except via limited access and a highly security-protected exchange. Thus, in the event of the wafer being stolen, the chips on the wafer may not be operated. In addition, if the security memory is positioned on the scribe lines, the information relating to the secret keys will be physically destroyed upon dicing the wafer, preventing a fraudster from attempting to recover the secret keys on becoming aware a posteriori that the chips on the wafer are locked.

A second entity wishing to operate the chips has to read the secret keys in the memory of the wafer, in the manner explained above with regard to the test data, and then use these keys to unlock the chips before their final use. This unlocking may be carried out during the processing of the wafer, before it is diced, or just before final commercialization of the completed integrated circuit, to preserve (for as long as possible) a high level of security in the integrated-circuit fabrication process.

The locking and unlocking phases require communication with each chip to be locked/unlocked, and communication with the corresponding security memory of the wafer to write/read the secret locking/unlocking key. According to one advantageous embodiment, a read device communicates directly with a security memory on the wafer. This security memory is connected to several chips 2 on the wafer allowing for these various chips 2 to be locked/unlocked automatically. This link between the security memory and the chips 2 on the wafer may, for example, includes various communication buses according to an approach described in document EP 0 606 805. This is accomplished by way of a processing chip, as described above, positioned in scribe lines on the wafer, or by way of one of the chips present on the wafer, which automatically carries out all or some of the security procedures, and particularly operations of locking/unlocking the chips by a program.

That which is claimed is:

1. A method for fabricating a semiconductor wafer comprising:
    forming a plurality of integrated circuit chips on the semiconductor wafer separated by scribe lines, and forming at least one memory on the semiconductor wafer;
    locking at least one of the integrated circuit chips based upon at least one secret key; and
    writing the at least one secret key into the at least one memory.

2. The method of claim 1 wherein the at least one secret key comprises a respective secret key for each of the integrated circuit chips.

3. The method of claim 1 wherein the at least one memory comprises a respective memory for each of the integrated circuit chips.

4. The method of claim 1 wherein the at least one memory is positioned on at least one of the scribe lines.

5. The method of claim 1 wherein forming further comprises forming a contactless communication device at least partly on a scribe line on the semiconductor wafer and coupled to the memory; and wherein writing comprises writing the at least one secret key into the memory by contactless communication between a reader and the contactless communication device.

6. The method of claim 1 further comprising connecting contacts of a probe to a given integrated circuit chip on the semiconductor wafer, and forming a processing chip on the semiconductor wafer associated with the memory; and wherein writing further comprises writing the at least one secret key into the at least one memory via the processing chip.

7. The method of claim 1 wherein locking comprises locking all of the integrated circuit chips on the semiconductor wafer using a respective secret key for each integrated circuit chip; and wherein writing comprises writing all of the secret keys into the at least one memory.

8. The method of claim 7 wherein each of the secret keys is unique.

9. The method of claim 1 wherein forming further comprises forming a test chip on the semiconductor wafer for performing at least one of a wafer test and a security operation.

10. The method of claim 1 further comprising unlocking the at least one integrated circuit chip based upon the at least one secret key stored in the memory.

11. The method of claim 10 wherein forming further comprises forming a contactless communication device at least partly on a scribe line on the semiconductor wafer and coupled to the memory; and further comprising reading the at least one secret key from the memory using contactless communication via the contactless communication device.

12. The method of claim 11 wherein the contactless communication device comprises at least one of an inductive contactless communication device and a capacitive contactless communication device.

13. The method of claim 10 further comprising dicing the plurality of integrated circuit chips after unlocking.

14. The method of claim 1 wherein forming further comprises forming a processing chip coupled to the at least one integrated circuit chip via a communications bus;
    and further comprising unlocking the at least one integrated circuit chip using the processing chip.

15. An apparatus for fabricating semiconductor devices comprising:
    a fabrication device for forming a plurality of integrated circuit chips on a semiconductor wafer separated by scribe lines, and forming at least one memory on the semiconductor wafer; and
    a reader device for
        locking at least one of said integrated circuit chips based upon at least one secret key; and
        writing the at least one secret key into the at least one memory.

16. The apparatus of claim 15 wherein the at least one secret key comprises a respective secret key for each of said integrated circuit chips.

17. The apparatus of claim 15 wherein the at least one memory comprises a respective memory for each of the integrated circuit chips.

18. The apparatus of claim 15 wherein the at least one memory is positioned on at least one of the scribe lines.

19. The apparatus of claim 15 wherein said fabrication device further forms a contactless communication device at least partly on a scribe line on the semiconductor wafer and coupled to the memory; and wherein said reader devices writes the at least one secret key into the memory by contactless communication between a reader and the contactless communication device.

20. The apparatus of claim 15 wherein said reader device locks all of the integrated circuit chips on the semiconductor wafer using a respective secret key for each integrated circuit chip, and writes all of the secret keys into the at least one memory.

21. The apparatus of claim 15 wherein said fabrication device further forms a test chip on the semiconductor wafer for performing at least one of a wafer test or security operation.

22. An apparatus for processing integrated circuit devices from a semiconductor wafer comprising a plurality of integrated circuit chips separated by scribe lines and at least one memory thereon, at least one of the integrated circuit chips being locked based upon at least one secret key, and the at least one secret key being stored in the memory, the apparatus comprising:
   a reader device for unlocking the at least one integrated circuit chip based upon the at least one secret key stored in the memory; and
   a dicing device for dicing the integrated circuit chips apart from one another after unlocking by said reader device.

23. The apparatus of claim 22 wherein the semiconductor device further comprises a contactless communication device at least partly on a scribe line on the semiconductor wafer and coupled to the memory; and wherein said reader device further reads the at least one secret key from the memory by contactless communication via the contactless communication device.

24. The apparatus of claim 22 wherein the semiconductor device further comprises a processing chip coupled to the at least one integrated circuit chip via a communications bus; and wherein said reader device unlocks the at least one integrated circuit chip using the processing chip.

25. An electronic device comprising:
   a semiconductor wafer;
   a plurality of integrated circuit chips on said semiconductor wafer and separated by scribe lines; and
   at least one memory on said semiconductor wafer;
   wherein at least one of the integrated circuit chips is locked based upon at least one secret key, and wherein the at least one secret key is stored in the at least one memory.

26. The electronic device of claim 25 wherein the at least one secret key comprises a respective secret key for each of the integrated circuit chips.

27. The electronic device of claim 25 wherein said at least one memory comprises a respective memory for each of said integrated circuit chips.

28. The electronic device of claim 25 wherein said at least one memory is positioned on at least one of the scribe lines.

29. The electronic device of claim 25 further comprising a contactless communication device at least partly on a scribe line on said semiconductor wafer and coupled to the memory.

30. The electronic device of claim 25 further comprising a processing chip on said semiconductor wafer associated with said at least one memory for writing the at least one secret key into the at least one memory.

31. The electronic device of claim 25 wherein all of said integrated circuit chips are locked using a respective secret key for each integrated circuit chip; and wherein all of the secret keys are stored in said at least one memory.

* * * * *